United States Patent [19]

Canterino et al.

[11] 4,205,114

[45] May 27, 1980

[54] HEAT AND GREASE RESISTANT CONTAINERS COMPRISING POLY (P-METHYLSTYRENE)

[75] Inventors: Peter J. Canterino, Towaco; Harold A. Arbit, Highland Park, both of N.J.

[73] Assignee: Mobil Oil Corporation, New York, N.Y.

[21] Appl. No.: 961,353

[22] Filed: Nov. 16, 1978

Related U.S. Application Data

[63] Continuation-in-part of Ser. No. 943,416, Sep. 18, 1978, abandoned.

[51] Int. Cl.² ............................................... C08J 9/00
[52] U.S. Cl. ............................. 428/315; 204/159.2; 426/127; 426/129; 426/234; 521/79; 521/146; 521/915
[58] Field of Search .................... 521/79, 146, 915; 204/159.2; 428/315

[56] References Cited

U.S. PATENT DOCUMENTS

| | | | |
|---|---|---|---|
| 2,857,625 | 10/1958 | Carlson, Jr. | 521/79 |
| 3,060,513 | 10/1962 | Klink et al. | 521/915 |
| 3,242,238 | 3/1966 | Edberg et al. | 521/915 |
| 3,331,899 | 7/1967 | Immel | 521/915 |
| 3,515,615 | 6/1970 | Okada et al. | 204/159.2 |
| 3,640,913 | 2/1972 | Cerra | 521/915 |
| 3,725,317 | 4/1973 | Roden et al. | 521/79 |
| 3,832,312 | 8/1974 | Wright | 204/159.2 |
| 4,085,073 | 4/1978 | Suh et al. | 521/79 |

*Primary Examiner*—Morton Foelak
*Attorney, Agent, or Firm*—Charles A. Huggett; Hastings S. Trigg

[57] ABSTRACT

There are provided shaped articles, such as trays and food containers, thermoformed from oriented poly (p-methylstyrene) sheet, oriented foamed poly (p-methylstyrene) film with oriented poly (p-methylstyrene) foam or polystyrene foam, that have been cross-linked by exposure to radiation. Such articles are resistant to fats and fatty foods contained therein can be placed in microwave ovens without destruction by hot, melted fats. The articles can also withstand conventional oven temperatures.

8 Claims, 4 Drawing Figures

HEAT AND GREASE RESISTANT CONTAINERS COMPRISING POLY (P-METHYLSTYRENE)

CROSS-REFERENCE TO RELATED APPLICATIONS

This application is a continuation-in-part of copending application Ser. No. 943,416, filed Sept. 18, 1978, now abandoned

BACKGROUND OF THE INVENTION

1. Field of the Invention

This invention is concerned with trays and containers adaptable for holding food often containing fats, for cooking in a microwave oven.

2. Description of the Prior Art

It is well known in the art to produce various shaped articles from foamed and unfoamed polystyrene sheet by thermoforming methods. Many such articles are containers used for packaging foods.

Polystyrene containers, however, are melted by hot fats and can not be used to package fat-containing foods that are to be heated. Even when treated by radiation, the polystyrene containers still are not resistant to hot fats.

Surprisingly, it has been found that containers made from poly (p-methylstyrene), which are not per se resistant to hot fats, are resistant to hot fats when treated by radiation.

SUMMARY OF THE INVENTION

This invention provides thermoformed and irradiated shaped articles of foamed poly (p-methylstyrene) adaptable for packaging foods.

DESCRIPTION OF SPECIFIC EMBODIMENTS

Figure 1:
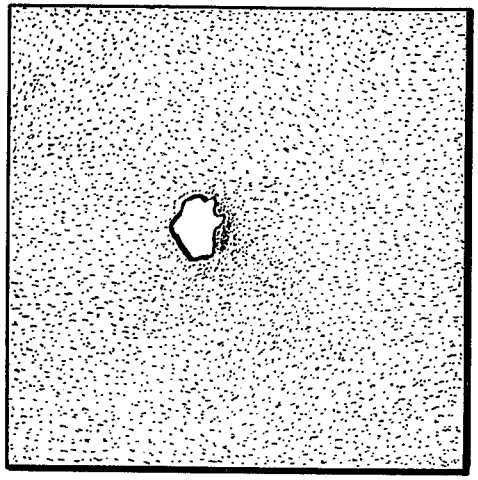
FIG. 1 presents a bottom view of foamed polystyrene after exposure for 2 minutes in a microwave oven with bacon thereon.

The monomer used in preparing the homopolymer or copolymers from which the shaped articles or containers of this invention are made is p-methylstyrene. It is within the contemplation of this invention to use mixtures of methylstyrene rich in p-methylstyrene. Such mixtures contain at least 95 weight percent, preferably 97-99 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolmers containing between about 10 and about 1 weight percent conjugated diene, such as butadiene and isoprene. The polymerization reaction is carried out by using methods and catalysts well known in the art for polymerizing styrene. The reaction can be carried out in solution, bulk, suspension, or emulsion.

Within the contemplation of this invention, "shaped articles of biaxially oriented poly (p-methylstyrene)" includes shaped articles made from foamed poly (p-methylstyrene) sheet, from biaxially oriented poly (p-methylstyrene) sheet, from biaxially oriented poly (p-methylstyrene) film laminated with biaxially oriented foamed poly (p-methylstyrene) sheet, or from biaxially oriented poly (p-methylstyrene) film laminated with foamed polystyrene sheet. For the purposes of this invention, so long as poly (p-methylstyrene) is included in some form, shaped articles made from any of the aforedescribed sheet forms, when irradiated, will be resistant to microwave oven conditions.

The manner by which foamed sheet is prepared from the aforedescribed polymers or copolymers is not an essential feature of this invention. The general methods of forming foamed sheet are discussed in U.S. Pat. No. 3,444,283 which is incorporated herein by reference. The preferred method is a direct injection extrusion operation described in U.S. Pat. No. 3,444,283. Reference is made herein to U.S. Pat. No. 3,619,445, incorporated herein by reference, which describes the complete direct injection extrusion foam lines. Ser. No. 506,836, referred to in U.S. Pat. No. 3,619,445, is not U.S. Pat. No. 3,444,283. As described in these incorporated patents, nucleating or cell size control agents can be used.

The poly (p-methylstyrene) sheet contemplated herein can be produced by any known technique for making oriented polystyrene sheet or film. A feasible method is described in U.S. Pat. No. 3,682,730, particularly in Columns 5 and 6, which patent is incorporated herein by reference.

The laminates of poly (p-methylstyrene) film with foamed polystyrene or poly (p-methylstyrene) sheet are prepared as described in the aforementioned U.S. Pat. No. 3,682,730, incorporated herein by reference. Either foamed polystyrene sheet or foamed poly (p-methylstyrene) sheet can be used, so long as the film laminated thereto is poly (p-methylstyrene).

The processes of thermoforming to produce shaped articles are well known to those skilled in the art. A generally preferred method of thermoforming is vacuum forming. The shaped articles produced by thermoforming poly (p-methylstyrene) sheet can vary widely. Typical shapes that are utilizable include trays, tubs, bowls, cups, and the like. Such shaped articles are adaptable for packaging foods and, when made from poly (p-methylstyrene) and irradiated in accordance with this invention, are adaptable for packaging foods containing fats.

In accordance with this invention, the shaped articles made from poly (p-methylstyrene) are irradiated, i.e., subjected to ionizing radiation. Ionizing radiation is inclusive of extremely short-wavelength, high energetic, penetrating rays such as gamma rays, X-rays, and subatomic particles accelerated in cyclotrons, betatrons, synchrotrons, and linear accelerators. The efect of irradiating the shaped articles is to cross-link the poly (p-methylstyrene). The irradiation dose can be between about 30 megarads and about 70 megarads, preferably between about 50 megarads and about 60 megarads. If one of the well known cross-linking catalysts or accelerators is used, the dose can be lower, e.g., about 20 megarads.

Polystyrene has been treated by irradiation, but it is still not resistant to hot fats. It is the surprising discovery of this invention, however, that irradiated poly (p-methylstyrene) is resistant to hot fats. This is demonstrated in the following examples.

EXAMPLE 1

Using the procedure described in U.S. Pat. No. 3,619,445, with particular reference to the Example, polystyrene with cell size control agents defined in the Example was extruded as a foam and formed into foamed polystyrene sheet.

A portion of the foamed polystyrene sheet was irradiated by electron beam at a dose of 50 megarads. Upon a portion of the foamed polystyrene sheet that was not irradiated and upon the irradiated foamed polystyrene sheet each was placed 3.5 oz. bacon. Then each sheet with the bacon thereon was heated in a microwave oven for two minutes.

EXAMPLE 2

The entire procedure described in Example 1 was repeated, except that poly (p-methylstyrene) was used in place of polystyrene. The poly (p-methylstyrene) contained, by weight, 3 percent meta isomer, and 0.1 percent ortho isomer.

Figure 2:
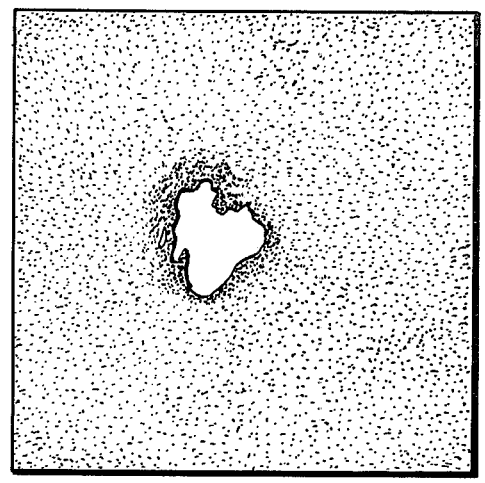
FIG. 2 presents a bottom view of irradiated foamed polystyrene after exposure for 2 minutes in a microwave oven, with bacon thereon.

The drawings show the sample portions of Example 1 and 2, after they were heated in a microwave oven for two minutes with bacon thereon. FIG. 1 presents a bottom view of the non-irradiated foamed polystyrene sheet with the bacon removed after heating in the microwave oven. FIG. 2 presents a bottom view of the irradiated foamed polystyrene sheet with the bacon removed after heating in the microwave oven. A comparison of FIGS. 1 and 2 shows that both the non-irradiated and the irradiated foamed polystyrene sheets are affected by hot fat, as exemplified with bacon fat, in that the fat melted a hole through the sheet.

Figure 3:
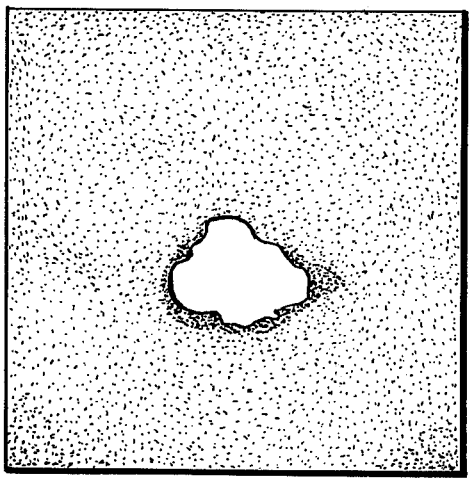
FIG. 3 presents a bottom view of foamed poly (p-methylstyrene) after exposure for 2 minutes in a microwave oven, with bacon thereon.
Figure 4:
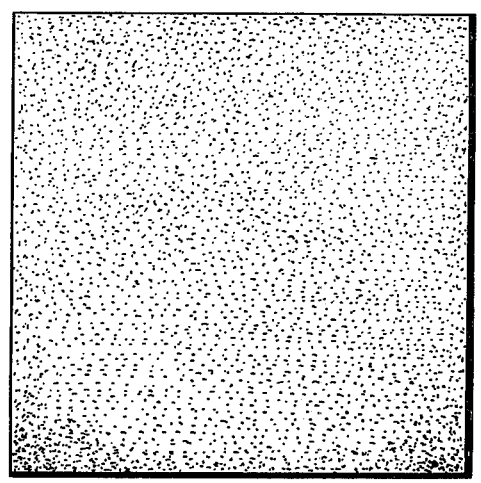
FIG. 4 presents a bottom view of irradiated foamed poly (p-methylstyrene) after exposure for 2 minutes in a microwave oven, with bacon thereon.

FIG. 3 presents a bottom view of the non-irradiated foamed poly (p-methylstyrene) sheet with the bacon removed after heating in the microwave oven. It is to be noted that the non-irradiated poly (p-methylstyrene) foam (FIG. 3) was affected by hot fat, just as the non-irradiated polystyrene foam (FIG. 1) was. On the other hand, the irradiated poly (p-methylstyrene) foam (FIG. 4) was heat resistant and totally unaffected by hot fat.

A portion of the poly (p-methylstyrene) foam sheet and a portion of the poly (p-methylstyrene) foam sheet irradiated by electron beam at a dose of 50 megarads (Example 2) were placed in a conventional oven at 300° F. for 15 minutes. The non-irradiated sheet showed evidence of collapse, whereas the irradiated sheet was relatively unaffected.

EXAMPLE 3

Using a thermoformed plate made from a laminate of polystyrene film on polystyrene foam sheet, part of the polystyrene film was removed and replaced with poly (p-methylstyrene) film. The plate was then irradiated at a dosage of 60 megarads. Bacon was placed on each portion of the plate and the entire assembly was heated in a microwave oven for two minutes. In the portion laminated with polystyrene film, fat melted through the plate. The portion laminated with poly (p-methylstyrene) was not affected by the bacon fat, after exposure in the microwave oven.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. Thermoformed and irradiated with ionizing radiation at a dose between about 30 megarads and about 70 megarads shaped articles of poly (p-methylstyrene) for use as food containers which are resistant to fats.

2. The shaped articles of claim 1, wherein the poly (p-methylstyrene) is in the form of foam sheet.

3. The shaped articles of claim 1, wherein the poly (p-methylstyrene) is in the form of a laminate of poly (p-methylstyrene) film laminated on foamed polystyrene or poly (p-methylstyrene) sheet.

4. The shaped articles of claim 1, wherein the poly (p-methylstyrene) is in the form of sheet.

5. The method for producing shaped articles adaptable for use as food containers which are resistant to fats, that comprises thermoforming sheet material containing poly (p-methylstyrene) to produce a shaped article and subjecting said article to ionizing radiation at a dose between about 30 megarads and about 70 megarads.

6. The method of claim 5, wherein said sheet material is foamed poly(p-methylstyrene).

7. The method of claim 5, wherein said sheet material is poly(p-methylstyrene) film laminated on foamed polystyrene sheet or foamed poly(p-methylstyrene) sheet.

8. The method of claim 5, wherein said sheet material is poly(p-methylstyrene) sheet.

* * * * *